US012455750B2

(12) United States Patent
Chen et al.

(10) Patent No.: US 12,455,750 B2
(45) Date of Patent: Oct. 28, 2025

(54) MACHINE LEARNING FOR PREDICTING NEXT BEST ACTION

(71) Applicant: Microsoft Technology Licensing, LLC, Redmond, WA (US)

(72) Inventors: Yao Chen, San Jose, CA (US); Lingjie Weng, Sunnyvale, CA (US); Arvind Murali Mohan, Sunnyvale, CA (US); Hongbo Zhao, San Jose, CA (US); Lu Chen, Sunnyvale, CA (US); Dipen Thakkar, San Jose, CA (US); Xiaoxi Zhao, Milpitas, CA (US); Shifu Wang, San Jose, CA (US); Jim Chang, Cupertino, CA (US); Daniel D Thorndyke, San Jose, CA (US); Smriti R. Ramakrishnan, Belmont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 70 days.

(21) Appl. No.: 18/208,199

(22) Filed: Jun. 9, 2023

(65) Prior Publication Data
US 2024/0411573 A1    Dec. 12, 2024

(51) Int. Cl.
*G06F 9/451* (2018.01)
(52) U.S. Cl.
CPC .................. *G06F 9/453* (2018.02)
(58) Field of Classification Search
CPC ..................................... G06F 9/453
See application file for complete search history.

(56) References Cited

U.S. PATENT DOCUMENTS

| | | | |
|---|---|---|---|
| 12,033,258 B1* | 7/2024 | Sohail | G10L 21/10 |
| 2015/0106148 A1* | 4/2015 | Thomas | G06Q 50/01 |
| | | | 705/7.19 |
| 2015/0154636 A1* | 6/2015 | Spitkovsky | G06Q 30/0256 |
| | | | 705/14.54 |
| 2019/0341040 A1* | 11/2019 | Kirazci | G06F 3/0485 |
| 2020/0085394 A1* | 3/2020 | Turcea | A61B 5/352 |
| 2024/0184974 A1* | 6/2024 | Burris | G06F 16/35 |
| 2024/0202094 A1* | 6/2024 | Bhudavaram | G06F 9/453 |
| 2024/0330695 A1* | 10/2024 | Manchanda | G06N 3/04 |
| 2024/0412299 A1 | 12/2024 | Gupta et al. | |

* cited by examiner

*Primary Examiner* — Angie Badawi
(74) *Attorney, Agent, or Firm* — CANTOR COLBURN LLP; Renee D. Brown

(57) ABSTRACT

In an example embodiment, machine learning is utilized to make recommendations for next actions by users of an online network. These next actions are called "next best actions." The machine learning may be performed to train a multitask deep machine learning model to make recommendations based on a series of inputs, including, for example, contextual information that relies upon action sequences of the user and historical users, and user intent. The use of a multitask deep machine learning model allows for the model to generate action recommendations that are personalized, contextual, and coordinate across various different aspects of the online network, rather than being limited to only a single aspect. Likewise, the multi-task deep machine learning model can also be tailored to optimized different use-case specific objectives while at the same time being easy to scale and maintain.

20 Claims, 12 Drawing Sheets

SUGGESTED FOR YOU

◆ PRIVATE TO YOU

BEGINNER

COMPLETE 4 STEPS TO ACHIEVE INTERMEDIATE

0/7

WHERE DO YOU CURRENTLY WORK?

MEMBERS WHO INCLUDE AT LEAST ONE POSITION RECEIVE UP TO 3.5 TIME AS MANY PROFILE VIEWS

ADD POSITION

◎ WHERE ARE YOU LOCATED?

MEMBERS WHO INCLUDE A POSTAL CODE LOCATION RECIEVE UP TO 70% AS MANY PROFILE VIEWS

ADD LOCATION

XYZ                                                                                        YESTERDAY
TO: PHOEBE AMOS

PHOEBE, YOU'RE ON A ROLL WITH YOUR CAREER!

XYZ

NOW, TAKE THESE NEXT STEPS FOR MORE SUCCESS

FOLLOW PEOPLE WHO CAN INSPIRE YOU AT WORK
BECAUSE YOU FOLLOWED EMILY KNIGHT

CANDY SEYMOR
PROJECT MANAGER
FOLLOWED BY
BRONWIN BROWN
AND 4 OTHERS
FOLLOW

JIM CANDY
TOWN PLANNER 1,393 FOLLOWERS
FOLLOW

VIEW MORE

CHECK OUT HELPFUL CAREER CONVERSATIONS
BECAUSE YOU VIEWED MAVIS STOKES POST

AARAN KHAN
ATTORNEY, NUENO COFFEE

LOOKING TO USE MACHINE LEARNING? THIS BLOG
HOW TO GET THE MOST FROM TH.....SEE MORE

LOOKING TO USE MACHINE LEARNING? THIS BLOG
HOW TO GET THE MOST FROM TH.....SEE MORE

*FIG. 8*

MACHINE LEARNING FOR PREDICTING NEXT BEST ACTION

TECHNICAL FIELD

The present disclosure generally relates to technical problems encountered in machine learning. More specifically, the present disclosure relates to the use of machine learning for next best action prediction in online networks.

BACKGROUND

The rise of the Internet has occasioned two disparate yet related phenomena: the increase in the presence of online networks, such as social networking services, with their corresponding user profiles and posts visible to large numbers of people; and the increase in the use of such online networks for various forms of communications.

BRIEF DESCRIPTION OF THE DRAWINGS

Some embodiments of the technology are illustrated, by way of example and not limitation, in the figures of the accompanying drawings.

FIG. 5 is a representation of a screen capture depicting a landing page, in accordance with an example embodiment.

FIG. 7 is a representation of a screen capture depicting a profile edit guidance screen, in accordance with an example embodiment.

FIG. 8 is a representation of a screen capture depicting a digest email, in accordance with an example embodiment.

DETAILED DESCRIPTION

Overview

Figure 1:
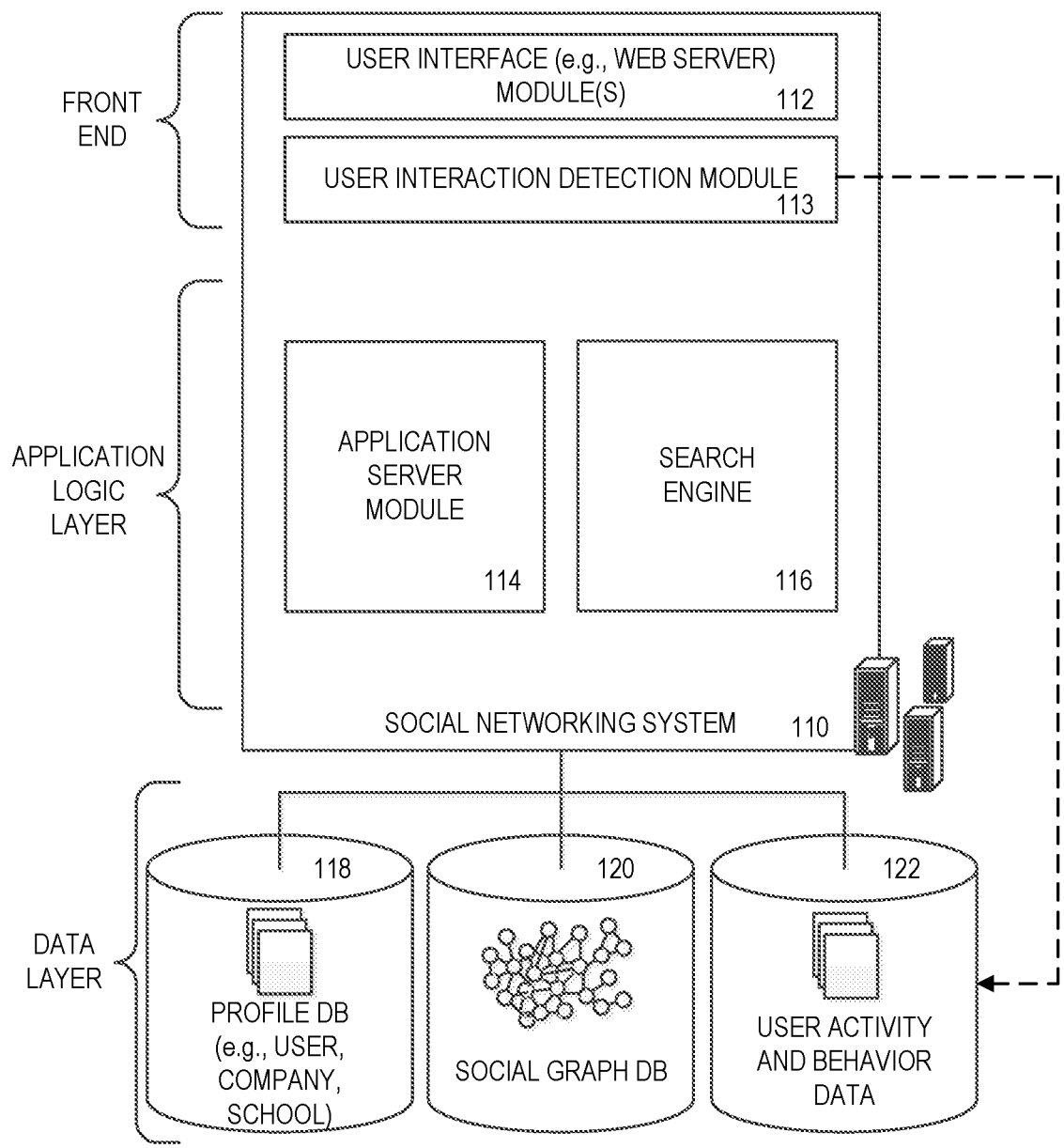
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

The various interactions that occur within an online network and the timing and ordering in which they occur may be called "sequences." More particularly, a sequence is an ordered list of interactions that occur in the online network, which may be measured either at the user level (e.g., these are the interactions that this particular user had with the online service and when the interactions took place) or at the content level (e.g., these are the interactions various users had with this piece of content on the online network and the timing of the interactions).

At the user-level, it may be useful to use these past sequences to generate action recommendations for suggested next actions for users in various different contexts of an online network. For example, if the online network is one that provides the ability for users to post resumes/prior work experience and view job listings, a user may decide to search for various job listings that they think match their skills and experience. While one action they may be aware of after viewing a job listing is an action to apply for a job associated with a particular job listing, there may be other possible actions for the user to take that they may not be aware of, or perhaps simply not think of, in that moment. Examples include finding a course to improve particular job skills needed for the job, subscribing to updates about news from the company or sector related to the job, networking with other similar users, etc.

In an example embodiment, machine learning is utilized to make recommendations for next actions by users of an online network. These next actions are called "next best actions." The machine learning may be performed to train a multitask deep machine learning model to make recommendations based on a series of inputs, including, for example, contextual information that relies upon action sequences of the user and historical users, and user intent. The use of a multitask deep machine learning model allows for the model to generate action recommendations that are personalized, contextual, and reflect cross-pillar holistic actions of the online network, rather than being limited to only a single pillar. Cross-pillar holistic means that the action candidates can be from different portions of an online platform, such as Feed and Jobs. Likewise, the multi-task deep machine learning model can also be tailored to optimized different use-case specific objectives while at the same time being easy to scale and maintain.

User intent may be inferred utilizing various implicit and explicit signals from the online network. Based at least in part on this intent, the multitask deep machine learning model makes recommendations, which may take the form of a ranking of various possible next actions.

A system for implementing the multitask deep machine learning model may have three parts. The first part is an artificial intelligence engine that includes the multitask deep machine learning model. The second part is a backend service to manage and serve the recommendations from the multitask deep machine learning model. The third part is a set of reusable user interface components that can be integrated across the online network.

This system provides several advantages. First, it allows for personalized and intelligent recommendations; the multitask deep machine learning model ensures that users get recommendations most relevant to them. Second, it allows for cross-pillar holistic action recommendations. Third, it supports multiple objectives for optimization by the artificial intelligence action. Fourth, the system knows about the different recommendations served across different portions (also known as "surfaces") of the online network and can coordinate the frequency and sequencing accordingly to achieve maximum effectiveness. Fifth, the system considers the actions users take prior to serving the recommendations to ensure coherence with the current context. Sixth, a configuration-based onboarding process can be provided with minimum code changes required for customization. Seventh, tracking data from all use-cases can be combined and used by the artificial intelligence engine to train a unified multitask deep machine learning model. Eighth, once a recommendation type is onboarded, it can be used by all existing and future use cases without additional work, resulting in a shared recommendation inventory.

DESCRIPTION

The term "sequence" in this context means an ordered list of interactions with an online network. While it is not mandatory, these sequences can also indicate the collecting of the interactions, beyond merely the ordering. More particularly, for example, a sequence may indicate that interaction A occurred, then interaction B occurred, and then interaction C occurred, and so on, and may optionally indicate that interaction A occurred at a first date/time (timestamp), interaction B occurred at a second date/time, and interaction C occurred at a third date/time.

For purposes of this disclosure, the term "best" in the phrase "next best action" shall not be interpreted narrowly to require an absolute optimum action be predicted or recommended. Rather, "best", in this context, means that the recommended action is one that satisfies more than one objective specified by the online network. Examples of objectives can include, for example, maximizing short term engagement (e.g., recommending the action the user is most likely to immediately select), maximizing long-term engagement (e.g., recommending the action that is most likely to result in the user engaging in many actions within the online network), maximizing the likelihood of specific actions being undertaken at some point, whether short-term or long-term (e.g., recommending the action that is most likely to get the user to apply for the job associated with the job listing), etc. By using a multi-task deep machine learning model, the recommendations are able to maximize the benefit to the online network across some or even all of these objectives simultaneously.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based Application Program Interface (API) requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118 or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by a search engine 116 to determine search results for a search query.

Although not shown, in some embodiments, a social networking system 110 provides an API module via which applications and services can access various data and services provided or maintained by the social networking service. For example, using an API, an application may be able to request and/or receive one or more recommendations. Such applications may be browser-based applications or may be operating system-specific. Some applications may reside and execute (at least partially) on one or more mobile devices (e.g., phone or tablet computing devices) within a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

Figure 2:
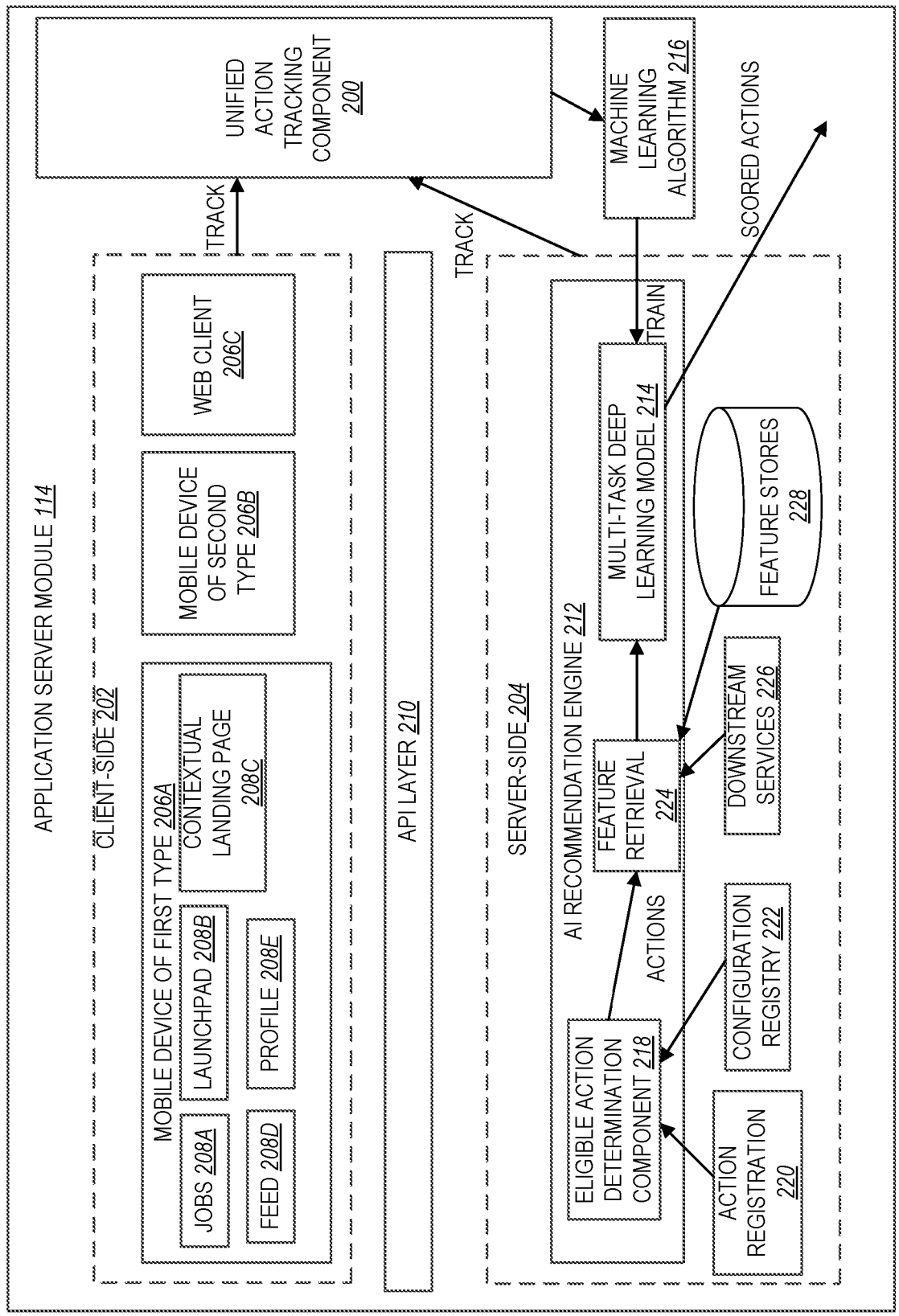
FIG. 2 is a block diagram illustrating the application server module of FIG. 1 in more detail, in accordance with an example embodiment.

FIG. 2 is a block diagram illustrating application server module 114 of FIG. 1 in more detail, in accordance with an example embodiment. While in many embodiments the application server module 114 will contain many subcomponents used to perform various actions within the social networking system 110, in FIG. 1, only those components that are relevant to the present disclosure are depicted.

Here, application server module 114 includes a unified action tracking component 200. The unified action tracking component 200 tracks actions taken on either (or both) the client-side 202 and the server-side 204. More particularly, the client-side 202 comprises a number of different types of clients for the online network. This may include, for example, mobile devices of first type client 206A, mobile devices of a second type client 206B, and web clients 206C (web pages running in web browsers, which may operate on any type of computing device, including desktop, laptop, and mobile devices).

Each of these different types of clients 206A-206C may include various different user interface sections, also called surfaces. Here, the sections include a jobs section 208A, a launchpad section 208B, a contextual landing page section 208C, a feed section 208D, and a profile section 208E, although these are merely examples, and any type of user interface section can be made available. Users interact with the online network via one or more of these sections 208A-208E within whichever types of client(s) 206A-206C they wish. Here, only the sections 208A-208E for the mobile device of the first type client 206A are depicted, but the other types of clients 206B, 206C may have the same or similar sections available for users to interact with the online network.

An application programming interface (API) layer 210 acts as an interface between the client-side 202 and the server-side 204. It also can act as a decoration layer that formats the user interface elements as appropriate.

On the server-side 204, an AI recommendation engine 212 uses a multi-task deep machine learning model 214 to make recommendations regarding next best actions for users. This multi-task deep machine learning model 214 may be trained using a machine learning algorithm 216. The trained multi-task deep machine learning model 214 may then be stored in a machine learning model repository, from which it can be downloaded by the AI recommendation engine 212.

More particularly, the unified action tracking component 200 tracks actions taken on either (or both) the client-side 202 and the server-side 204; this tracked information is used in the model training by the machine learning algorithm 216. Details about the training process will be described later in this disclosure.

After the multi-task deep machine learning model 214 is in use at the server-side 204, the API layer 210 receives navigation commands and potentially other commands from the client-side 202. Based on these navigation commands, which essentially tell the server-side 204 what user interface elements are being displayed to the user at any particular moment (e.g., which screen of an app or web page of a web site the user is currently viewing), an eligible action determination component 218 determines the eligible actions and configurations available. This essentially determines which actions should be ranked by the AI recommendation engine 212 and ensures that the AI recommendation engine 212 does not waste time or processing power evaluating actions that are not eligible to be performed in that particular context. The eligible action determination component 218 may base its determination on actions listed in an action registration 220 and configurations contained in a configuration registry 222.

A feature retrieval component 224 then fetches features relevant to the eligible actions from either downstream services 226, feature stores 228, or both. In some example embodiments, this feature data may need to be prepared or transformed in some way. This preparing may include, for example, transforming the feature data into a format to be accepted by the multi-task deep machine learning model

214, such as by filtering, reordering, embedding, and/or otherwise reformatting or altering the training data.

The multi-task deep machine learning model 214 ranks eligible actions for a user based on a request context and a display context. A request context is an indication of an action last taken by a user, such as accepting an invitation from an email, reacting to a feed post, etc. A display context is an indication of what is being displayed to the user, such as a landing page, an action drawer, an email, etc.

Other types of contexts may be tracked as well and used by the multi-task deep machine learning model 214 in ranking the eligible actions. These additional contexts may include, for example, intra-page context (different contexts within a single page), intra-session context (different contexts within the same session), inter-session context (different contexts across separate sessions), and latent (inferred) context.

The multi-task deep machine learning model 214 then scores each eligible action and ranks them based on those scores. The score for each eligible action is calculated using the multi-task deep machine learning model 214 to optimize over more than one task/goal.

It should be noted that while the model is described herein as a multi-task deep machine learning model, other types of machine learning models, such as tree-based models, may be used instead of a multi-task deep machine learning model.

Figure 3:
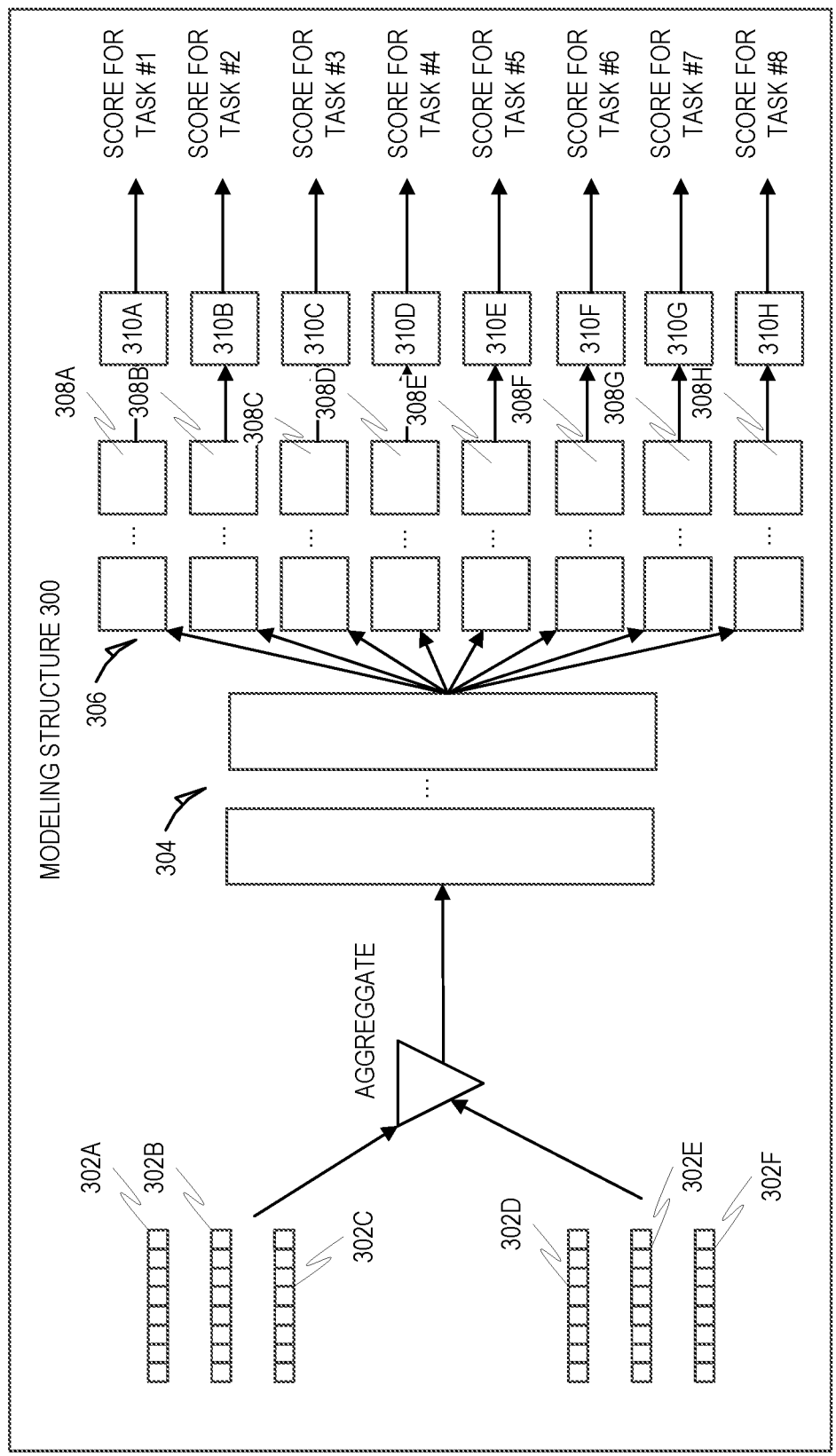
FIG. 3 is a block diagram illustrating a modelling structure contained in the machine learning algorithm of FIG. 2, in accordance with an example embodiment.

FIG. 3 is a block diagram illustrating a modeling structure 300 contained in the machine learning algorithm 216 of FIG. 2, in accordance with an example embodiment. In an example embodiment, the modeling structure 300 may be a convolutional neural network. Various features 302A-302F may be passed to an embedding layer 304. These various features 302A-302F may include, for example, context signals 302A, intent signals 302B, intent embeddings 302C, action features 302D, user features 302E, and other features 302F. In deep machine learning, an embedding layer is a layer that maps discrete categorical variables, such as words in natural language processing (NLP), to continuous vectors of real numbers, also known as embeddings. The main goal of an embedding layer is to capture the semantic relationships and contextual meanings between different categories. The output from the embedding layer 304 includes a series of embeddings. These embeddings are then passed through K shared layers 306. The K shared layers 306 attempt to learn weights for each of a plurality of different feature types based on the embeddings. The K shared layers operate for all the tasks together. Following that are different sets 308A-308H of task-specific layers, one for each task. Of course, the precise number of different sets 308A-308H of task-specific layers will depend on the number of tasks. In this example, three are shown. Each of these sets 308A-308N includes one or more dense layers 310A-310H and a softmax layer (not pictured).

At each dense layer 310A-310H, layer normalization is applied before rectifier linear unit activation. Residual connections are used between every two layers. A residual connection allows gradients to flow through a network directly, without passing through non-linear activation functions. Finally, the softmax layer 312 maps the output of an earlier layer to a probability distribution. In the softmax function, each output neuron represents the probability of the input belonging to a particular class.

In an example embodiment, the multi-task deep machine learning model is a deep convolutional neural network. In contrast to existing learning methods, which employ either unsupervised or single-task supervised objectives, the multi-task model learns the representations using multi-task objectives.

The learning process may be cast as multiple binary classification problems where a task c is associated with a cross entropy loss:

$$L_c = -\sum_{\langle m,s \rangle \in D_c} (y_c^{ms} * \log(r_c^{ms}) + (1 - y_c^{ms}) * \log(1 - r_c^{ms}))$$

Where $D_c$ is the labeled dataset collected under task c (through an impression/action log) and $y_c^{ms}$, $r_c^{ms}$ are the ground-truth action and models prediction for the <m, s> pair respectively, where m is the user and s is the skill.

One of two different heuristics may be used for combining task-specific losses. The first is simple sum. This is to treat each task as equally important as follows:

$$L^* = \sum_c L_c$$

The second heuristic is a weighted sum. In an example embodiment, the weighted sum is the heuristic used due to its better performance in many circumstances. Specifically, since the overall performance of the multi-task model is heavily dependent on the weights between task losses, a weighted sum loss can be used, and the weights of each task can be automatically learned. The output of each task c is modeled as the scaled version of the softmax:

$$p(y_c|f(x; W_c), \sigma_c) = \text{Softmax}\left(\frac{1}{\sigma_c^2} f(x; W_c)\right)$$

$W_c$ represents the task-specific parameters, meaning the task parameters that are unique to this task, $\sigma_c$ is a positive scalar and can be interpreted as the temperature of the Boltzmann distribution that determines the variance of the resulting distribution (the confidence of the score prediction). A Boltzmann distribution is a distribution defining a probability that a system will be in a certain state as a function of that state's energy and the temperature of the system. The Boltzmann distribution can be applied to the present technical problem by substituting the task-specific parameters for the temperature of the system. By assuming the independence of task distributions and maximizing the joint softmax likelihood of all tasks, the loss L* becomes:

$$L^* = -\log\left(\prod_c p(y_c|f(x; W_c), \sigma_c)\right)$$

$$= -\sum_c \log(p(y_c|f(x; W_c), \sigma_c))$$

$$\approx \sum_c \left(\frac{1}{2\sigma_c^2} L_c + \log \sigma_c\right)$$

where the new task-dependent loss now is $L'_c$:

$$L'_c = \frac{1}{2\sigma_c^2} L_c + \log \sigma_c$$

At each training step, one task c is randomly chosen, $L_c$ (or $L_c'$ in the case of weighted sum) is calculated, and the gradient is backpropagated to update the model's parameters.

Both dense features and embedding features are used in the model to maximize the advantage of combining human domain knowledge with regularities automatically learned by the machine.

Figure 4:
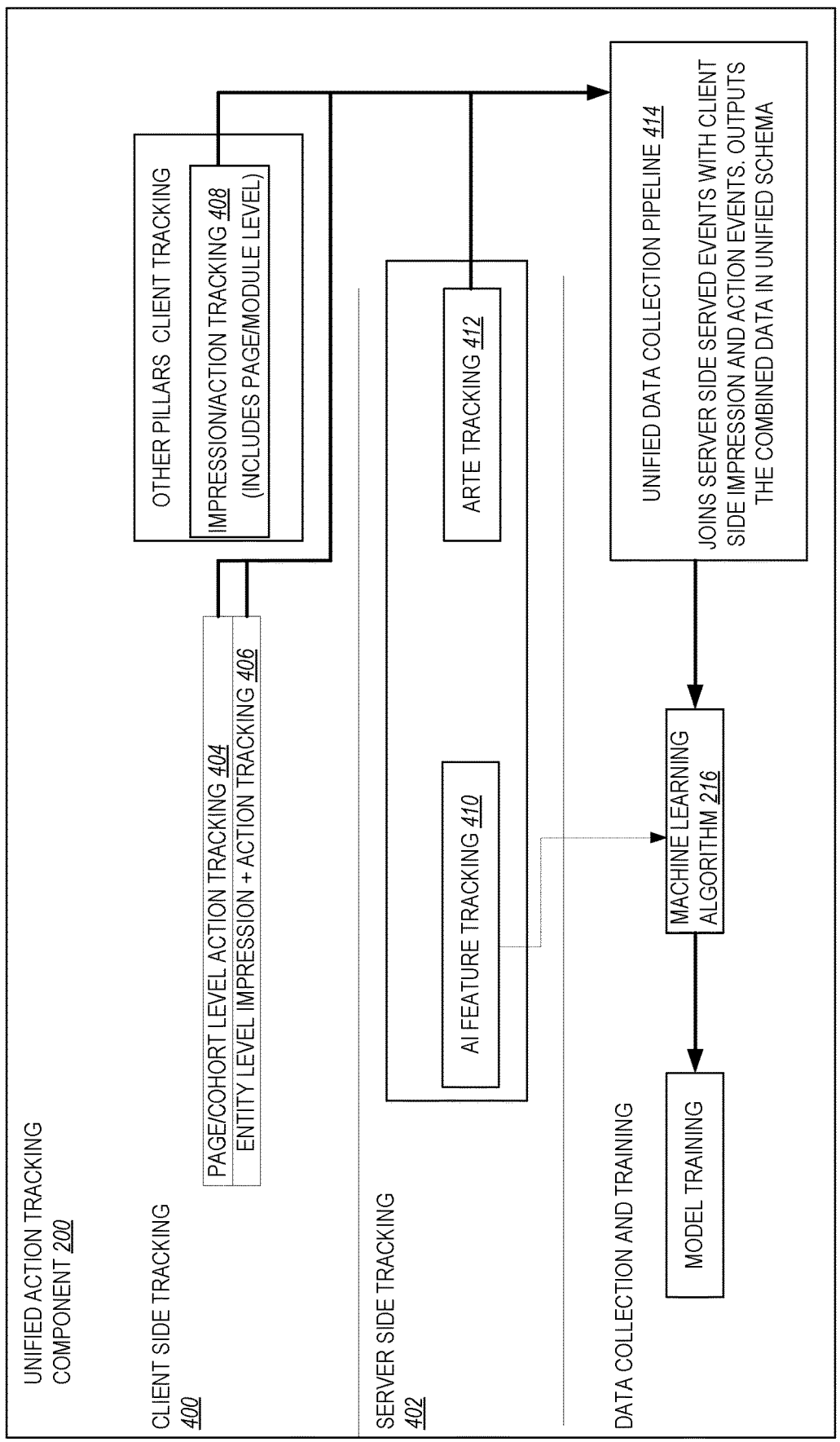
FIG. 4 is a block diagram illustrating a unified action tracking component in accordance with an example embodiment.

Referring briefly back to FIG. 2, the training process relies upon the tracking of the actions taken on the client-side 202 and the server-side 204 by the unified action tracking component 200. FIG. 4 is a block diagram illustrating a unified action tracking component 200 in accordance with an example embodiment. The unified action tracking component 200 is itself split into a client-side tracking component 400 and a server-side tracking component 402. The client-side tracking component 402 performs page/cohort level impression and action tracking 404, entity level impression and action tracking 406, and impression and action tracking 408 (which includes tracking at the page/module level).

The server-side tracking component 402 performs AI feature tracking 410 and action recommendation tracking event (ARTE) tracking 412. AI feature tracking involves tracking specific features used directly by the machine learning algorithm 216. ARTE tracking 412 involves tracking server-side events that are eventually passed to a unified data collection pipeline 414 (along with the events tracked by the page/cohort level impression and action tracking 404, entity level impression and action tracking 406, and impression and action tracking 408). The unified data collection pipeline 414 joins the server-side events and the client side impression and action events, and then outputs the combined data in a unified schema to the machine learning algorithm 216.

As mentioned above, the action recommendation aims to select the top K actions to present to the member, given a particular request and display context. Examples of request contexts include accepting an invitation from an email, reacting to a feed post, etc. Examples of display contexts include landing pages, action drawers, emails, etc.

For example, a request context may be a request to accept an invitation from user V to join the social networking service. The display context may be a landing page that user y is viewing. The possible action cohort may then include, for example, prompting user Y to view user V's company job, view user V's activity, or view information about cohorts of user V.

In another example, the request context may be a request to interact with user V's post (such as by reacting, sharing, clicking, or commenting), or following user V. The display context may be in an inline action drawer. The possible action cohort may then include, for example, prompting user Y to view other posts from user V, follow other people, or not show the action drawer.

In another example, the request context may be the user landing on their own profile page. The display context could be a variety of profile edit guidance cards. The action cohort may then include, for example, confirming current employment position, updating education, etc.

The request context and/or display context can also be used as input signals to the multi-task deep machine learning model. Additional contextual signals include intra-page context (what the user recently clicked on in the page, such as the number of impressions/actions on the current page), intra-session context (what the user interacted with in the current session, such as the number of actions of different types which the user took, and the topics the user engaged with), as well as inter-session context (what the user interacted with in the last K sessions, such as the number of actions of different types which the user took, and the topics the user engaged with). Additionally, latent context signals can also be used, such as member skills and content topicality.

Additionally, non-context signals, both explicit and implicit, may be used in both training and using the multi-task deep machine learning model. Explicit non-context signals include information collected directly from users, such as an indication of their openness to find a new job, responses to career questions/surveys, user posts, user follows, and user subscribes. Implicit non-context signals include signals inferred from user activities using models, such an embedding model. This may include scores such as a job seeker score (indicating a likelihood that a user is seeking a job), hiring intent score (indicating a likelihood that a user is hiring for a job), content contributor intent score (indicating a likelihood that a user intends to contribute content to the online network), content consumer intent score (indicating a likelihood that a user intends to consume content), and open to education score (indicating a likelihood that a user is open to additional education).

A landing page is a complete page that may be presented to a user following an action performed by the user. Typically, the landing page would be the first page displayed to the user in a graphical user interface corresponding to the online network after the user performs some action in another graphical user interface that does not correspond to the online network. The most common example would be the user clicking on a button to accept an invitation to link with another user, with the invitation having been delivered via email (and thus opened and the action selected using an email graphical user interface not corresponding to the online network).

Figure 5:
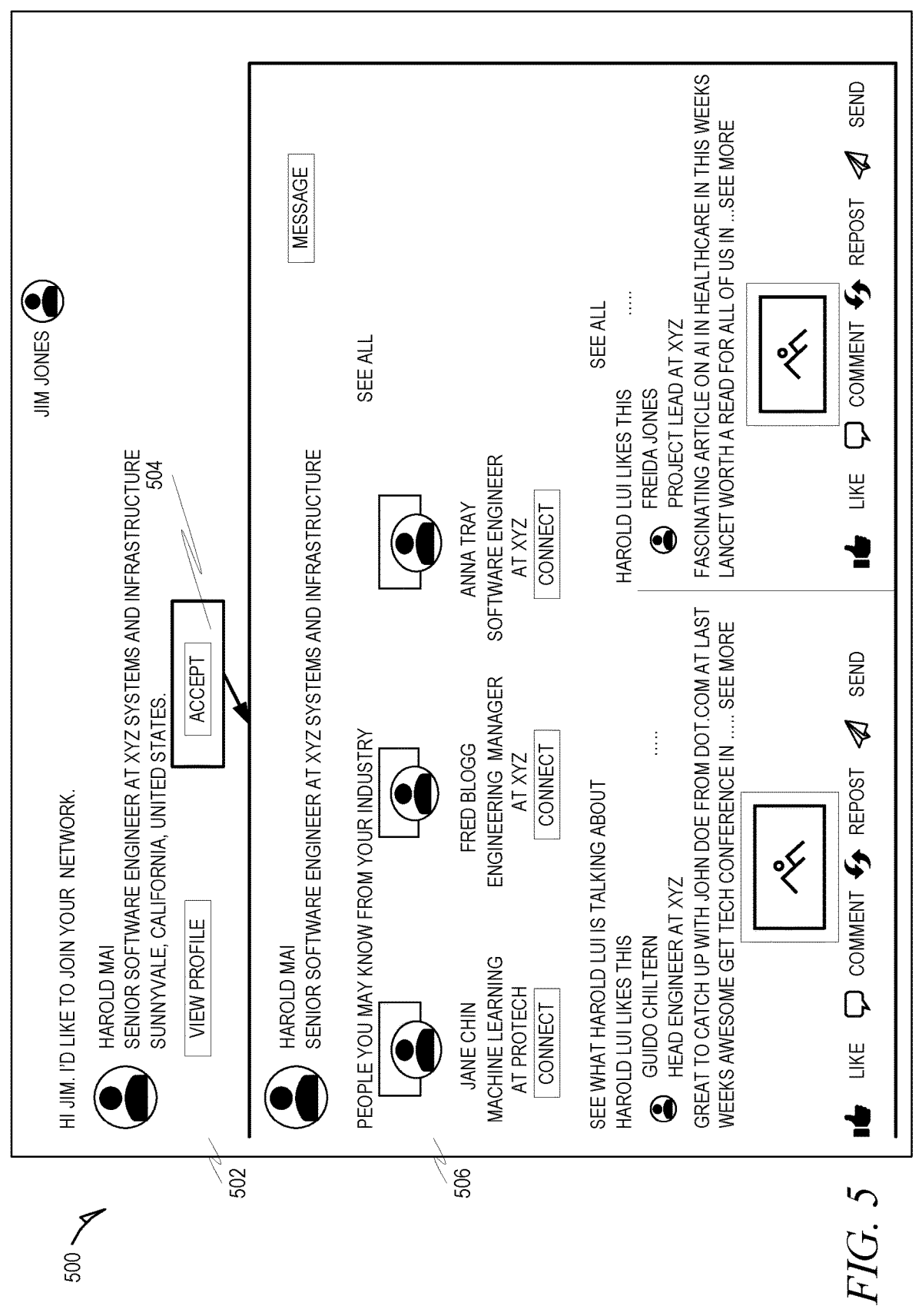

FIG. 5 is a representation of a screen capture depicting a landing page 500, in accordance with an example embodiment. Here, the user is presented with the invitation to accept in email graphical user interface 502. Clicking on the accept button 504 causes the launch of the graphical user interface 506 of the online network (either in a web browser or a dedicated application). Thus, in this case, the user's selection of the acceptance of the invitation causes the multi-task deep machine learning model 214 of FIG. 2 to rank one or more next actions to recommend, and then those recommended next actions are displayed in the landing page 500.

Figure 6:
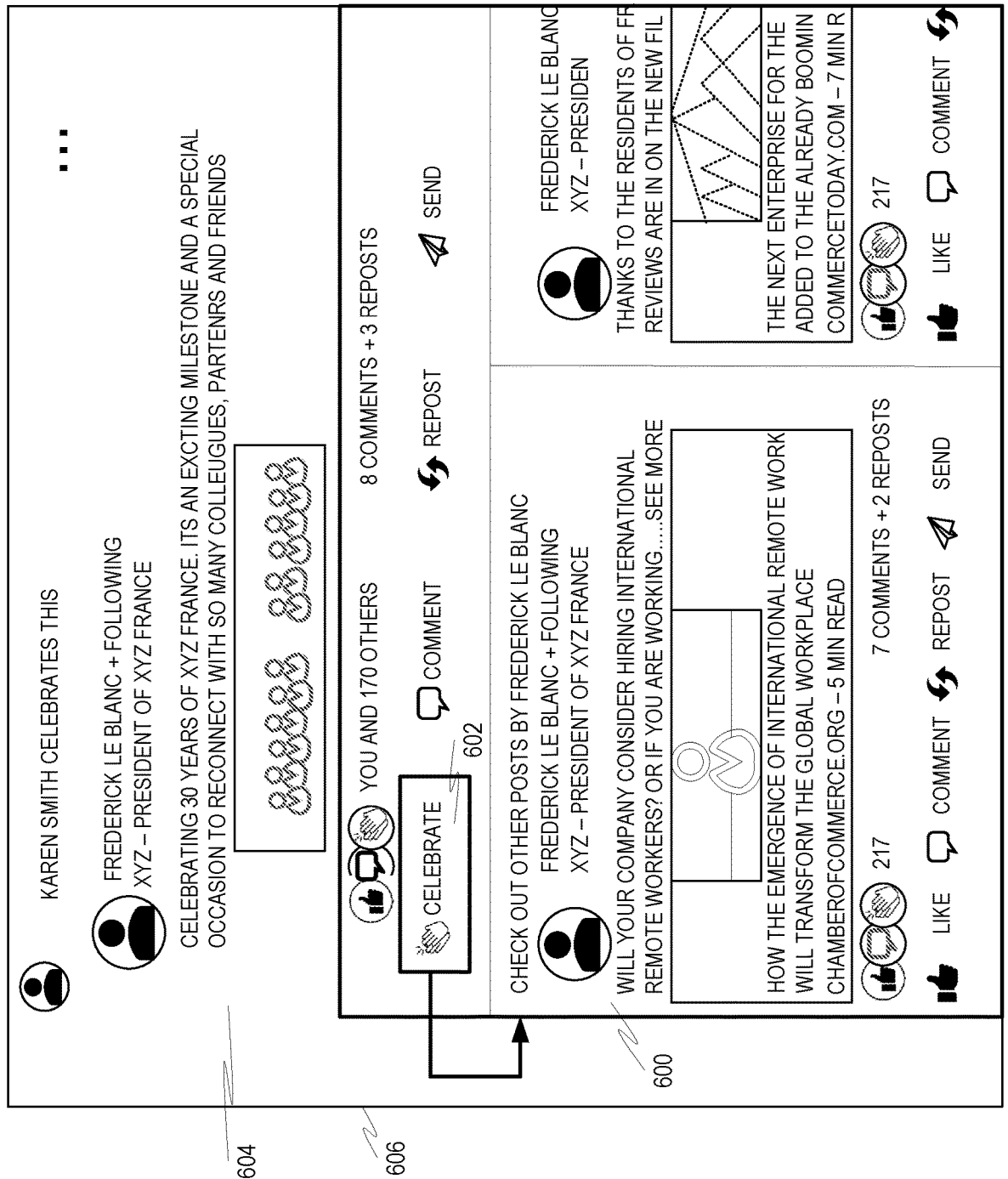
FIG. 6 is a representation of a screen capture depicting an action drawer, in accordance with an example embodiment.

An action drawer is a portion of a graphical user interface corresponding to the online network. Typically, this portion would be displayed after the user performs some action in the graphical user interface. FIG. 6 is a representation of a screen capture depicting an action drawer 600, in accordance with an example embodiment. Here, for example, the user selects a button 602 to celebrate a post 604 in a first portion of the graphical user interface 606. This causes the multi-task deep machine learning model 214 to rank one or more next actions to recommend, and then those recommended next actions are displayed in the action drawer 600.

A profile guidance screen is a portion of a graphical user interface dedicated to providing guidance for users to complete portions of a user profile. In an example embodiment, the profile guidance screen may be launched in response to a user navigating to their own user profile, and the recommended next actions, as determined by the multi-task deep machine learning model 214, may be displayed in that profile guidance edit screen. FIG. 7 is a representation of a screen capture depicting a profile edit guidance screen 700, in accordance with an example embodiment. Here, for example, the user is prompted to add information about where they currently work and where they are located.

There is also no requirement that the recommended actions be displayed within the graphical user interface of the online network itself. Embodiments are possible where the recommended actions are displayed in other graphical user interfaces, such as email programs or general web browsers open to email pages. The recommended actions may take the form of a digest email that is delivered to users. FIG. 8 is a representation of a screen capture depicting a digest email 800, in accordance with an example embodiment.

Figure 9:
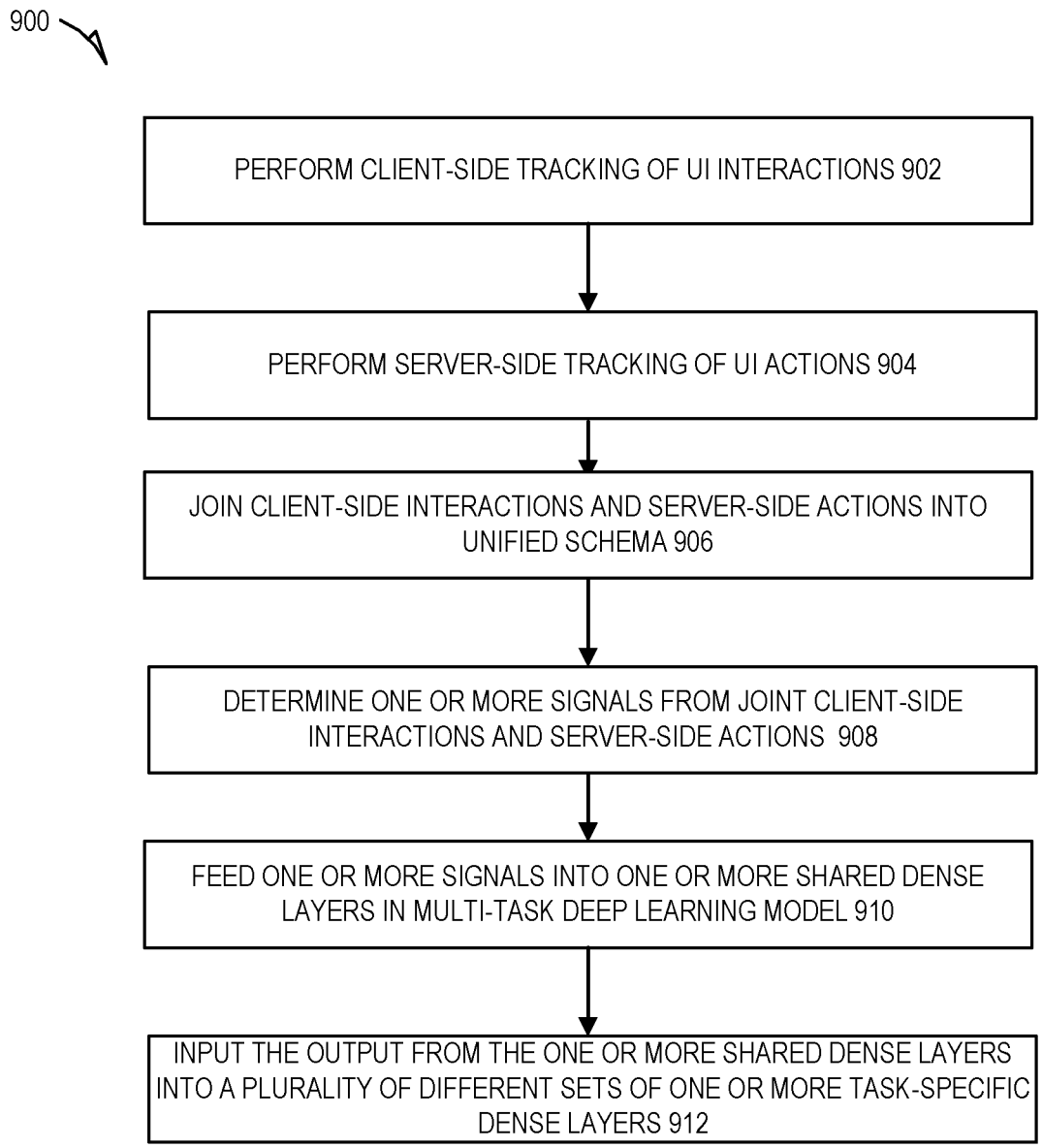
FIG. 9 is a flow diagram illustrating a method of training a multi-task deep machine learning model, in accordance with an example embodiment.

FIG. 9 is a flow diagram illustrating a method 900 of training a multi-task deep machine learning model, in accordance with an example embodiment. At operation 902, client-side tracking is performed of graphical user interface interactions by users with a client-side of a graphical user interface. At operation 904, server-side tracking of graphical user interface actions taken by a server-side of a graphical user interface is performed. At operation 906, the tracked client-side interactions and the tracked server-side actions are joined via a unified schema. At operation 908, one or more signals are determined from the joint client-side interactions and server-side actions. These signals may include intent signals indicating user intent. In some example embodiments, these intent signals may be in the form of embeddings produced by a separately trained embedding model. In some example embodiments, the one or more signals can include other types of features, such as context features, action features, and user features.

At operation 910, the one or more signals are fed to one or more shared dense layers in a multi-task deep machine learning model. Each of these dense layers may in some example embodiments be a rectifier unit (ReLU). A ReLU is a type of activation function that is linear for all positive values and zero for all negative values. An activation function helps a machine-learned model account for interaction effects (one variable affecting a prediction differently depending upon the value for another value) and non-linear effects. At operation 912, output from the one or more shared dense layers is input to a plurality of different sets of one or more task-specific dense layers. Each different set of one or more task-specific dense layers corresponds to a different task (e.g., goal) that the training of the multi-task deep machine learning model optimizes over. In some example embodiments, these tasks are different performance metrics related to an online network. For example, one task may be optimizing propensity of a user to interact with a particular displayed recommended next action (e.g., click on it), while another task may be optimizing propensity of the user to interact generally with the online network at some point after the recommended next action is displayed (long-term interactions). At each layer, one or more weights are tried iteratively until the task is optimized, and then cross entropy loss is optimized overall.

Figure 10:
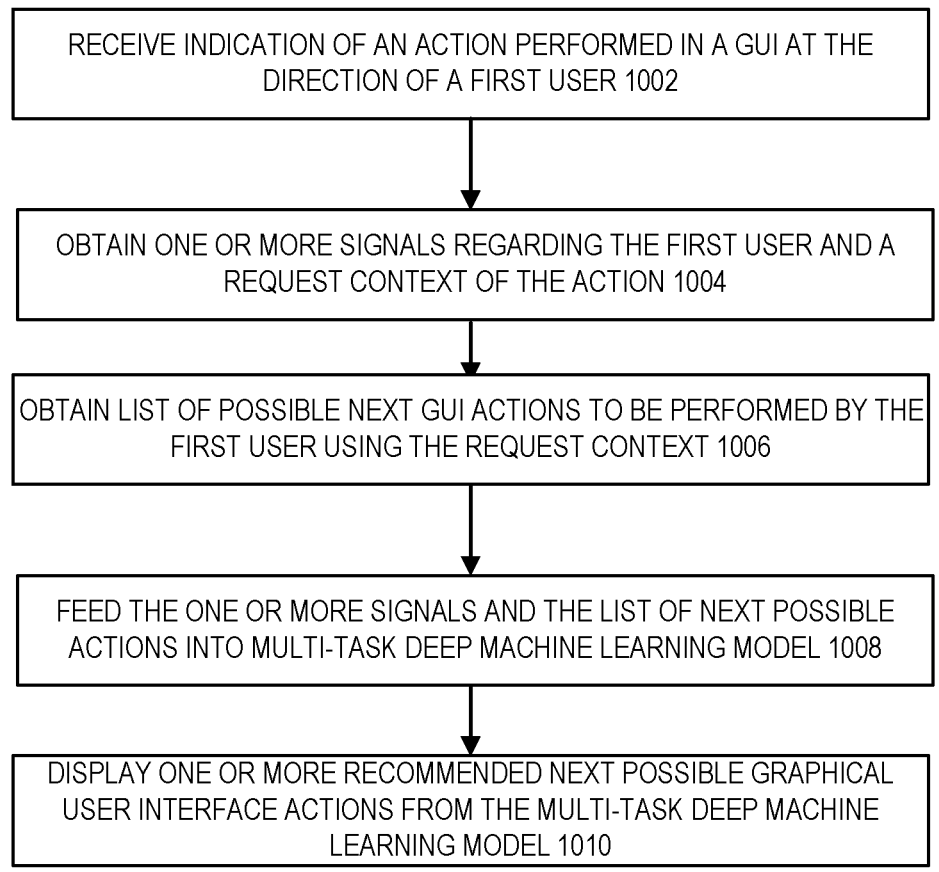
FIG. 10 is a flow diagram illustrating a method of recommending one or more next user interface actions, in accordance with an example embodiment.

FIG. 10 is a flow diagram illustrating a method 1000 of recommending one or more next user interface actions, in accordance with an example embodiment. At operation 1002, an indication of an action performed in a graphical user interface at the direction of a first user is received. At operation 1004, one or more signals regarding the first user and a request context of the action are obtained. The request context indicates a context of the graphical user interface in which the action was performed. At operation 1006, a list of possible next graphical user interface actions to be performed by the first user are obtained using the request context.

At operation 1008, the one or more signals and the list of next possible actions are fed into a multi-task deep machine learning model. The multi-task deep machine learning model outputs one or more recommended next possible graphical user interface actions from the list of next possible graphical user interface actions based on inferred intent of the first user from the one or more signals. The multi-task deep machine learning model is trained to output recommendations that optimize a plurality of different performance metrics. At operation 1010, the one or more recommended next possible graphical user interface actions are displayed. The displaying may occur in the same or a different graphical user interface than the graphical user interface in which the action was performed.

Figure 11:
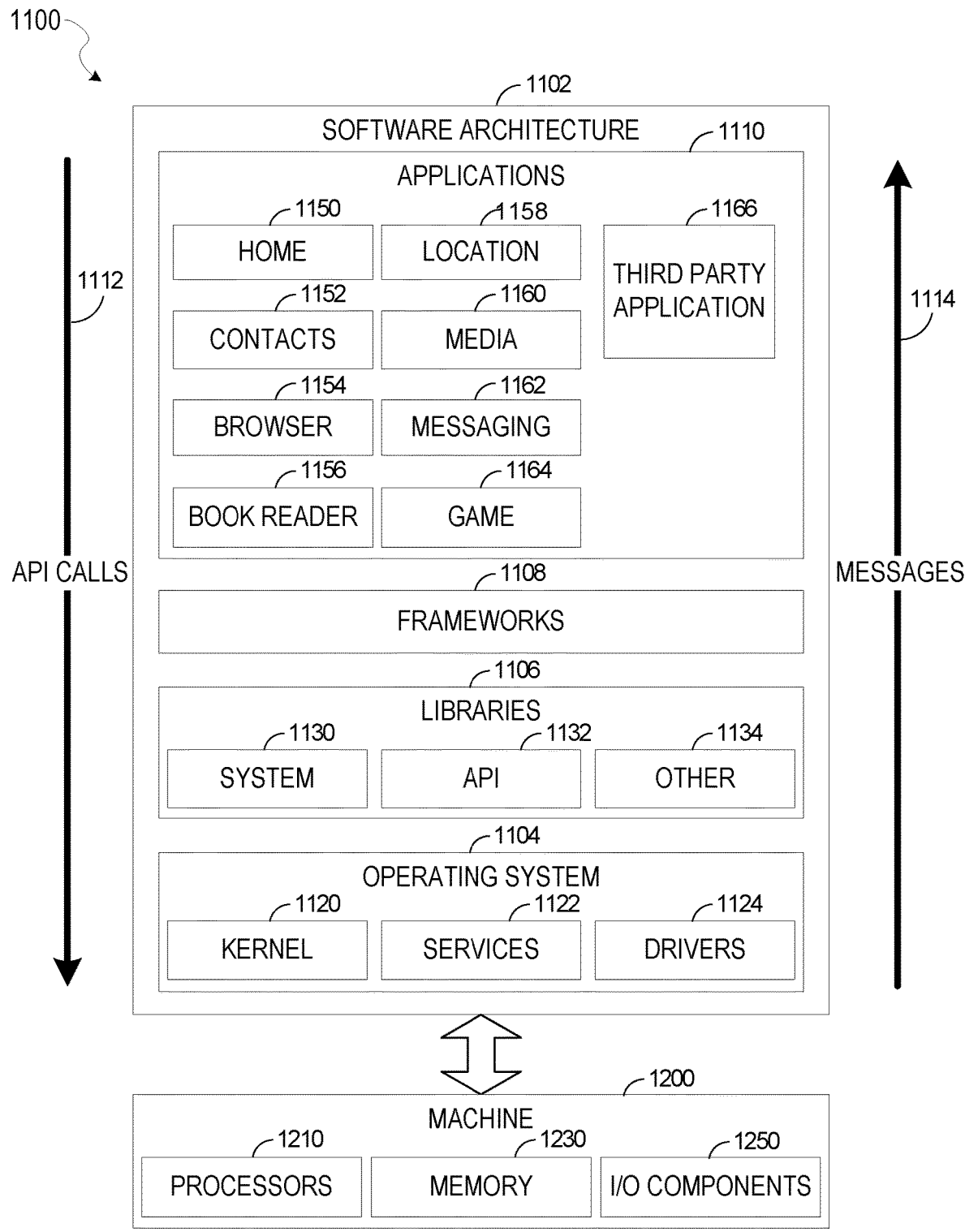
FIG. 11 is a block diagram illustrating a software architecture, in accordance with an example embodiment.

FIG. 11 is a block diagram 1100 illustrating a software architecture 1102, which can be installed on any one or more of the devices described above. FIG. 11 is merely a non-limiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and input/output (I/O) components 1250. In this example architecture, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionalities. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphical user interface functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications, such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
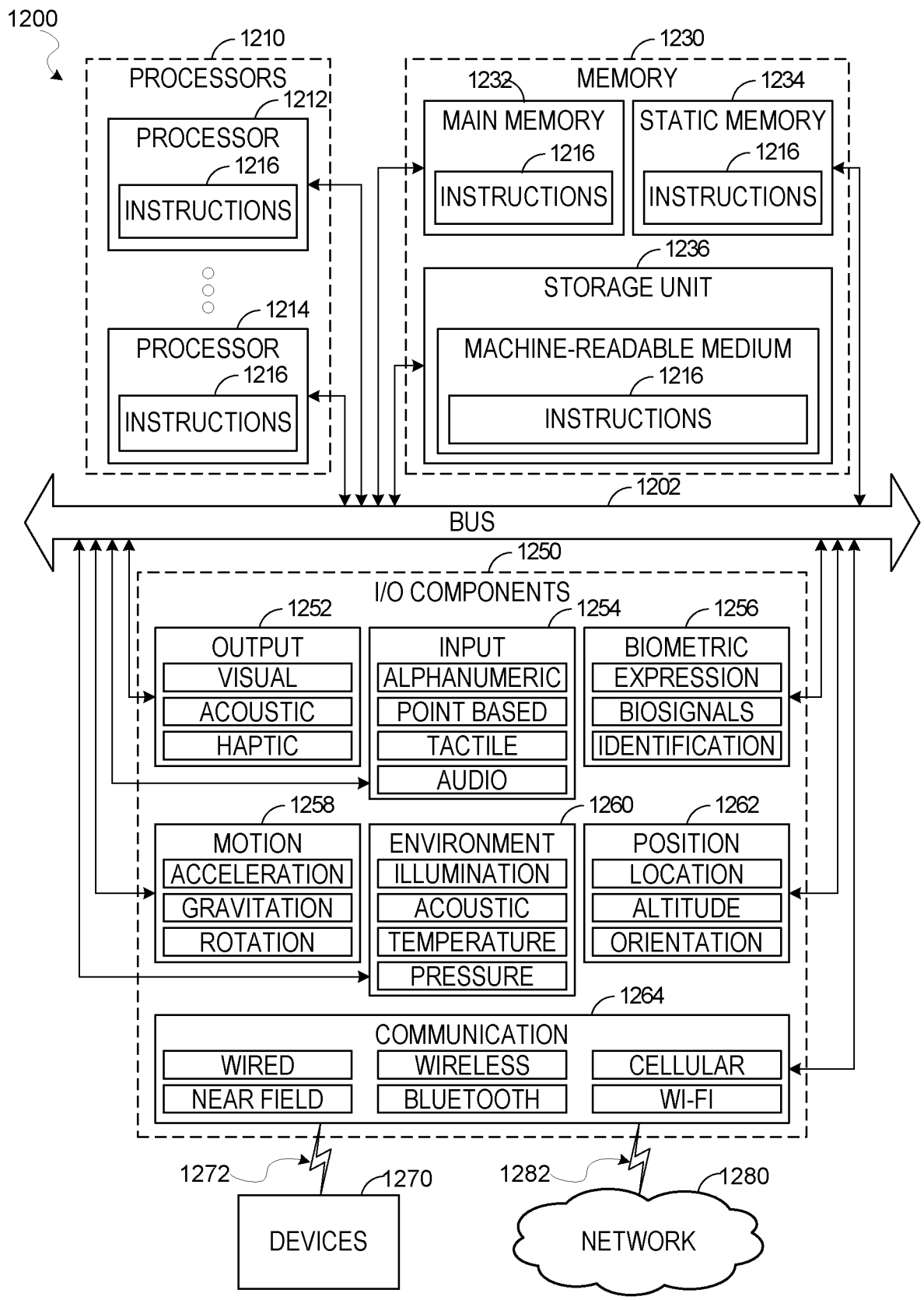
FIG. 12 illustrates a diagrammatic representation of a machine in the form of a computer system within which a set of instructions may be executed for causing the machine to perform any one or more of the methodologies discussed herein, according to an example embodiment.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein may be executed. For example, the instructions 1216 may cause the machine 1200 to execute the methods 900 and 1000 of FIGS. 9 and 10, respectively. Additionally, or alternatively, the instructions 1216 may implement FIGS. 1-10, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors 1212 (sometimes referred to as "cores") that may execute instructions 1216 contemporaneously. Although FIG. 12 shows multiple processors 1210, the machine 1200 may include a single processor 1212 with a single core, a single processor 1212 with multiple cores (e.g., a multi-core processor), multiple processors 1210 with a single core, multiple processors 1210 with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine 1200 will depend on the type of machine 1200. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1230, 1232, 1234, and/or memory of the processor(s) 1210) and/or the storage unit 1236 may store one or more sets of instructions 1216 and data structures (e.g., software) embodying or utilized by any one or more of the methodologies or functions described herein. These instructions (e.g., the instructions 1216), when executed by the processor(s) 1210, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to the processors 1210. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1280 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1216 may be transmitted or received over the network 1280 using a transmission medium via a network interface device (e.g., a network interface component included in the communication components 1264) and utilizing any one of several well-known transfer protocols (e.g., HTTP). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one processor;
   a non-transitory computer-readable medium having instructions stored thereon, which, when executed by the at least one processor, cause the system to perform operations comprising:
      receiving an indication of an action performed in a graphical user interface at direction of a first user;
      obtaining one or more signals regarding the first user and a request context of the action, the request context indicating a context of the graphical user interface in which the action was performed, the request context comprising at least one of intra-page context including a number of impressions taken by the first user on a current graphical user interface page, intra-session context including a number of actions taken and a type of action taken by the first user within a current session, or inter-session context including a number of actions of different types which the first user took over a predetermined number of prior sessions;
      retrieving, via an Application Program Interface (API) layer request, client-side navigation commands comprising a set of user interface elements currently displayed to the user after performing the action;
      obtaining, using the request context and the set of user interface elements currently displayed to the user, eligible actions comprising a list of next possible graphical user interface actions to be performed by the user;
      fetching, via a feature retrieval component, feature data for the eligible actions;
      training a deep machine learning model on actions comprising entity level impressions made to users and request contexts to output, for a given user and request context, next possible graphical user interface actions to present to the user;
      feeding the one or more signals and the feature data for the eligible actions into the deep machine learning model, the deep machine learning model outputting one or more recommended next possible graphical user interface actions from the list of next possible graphical user interface actions based on inferred intent of the first user from the one or more signals, the deep machine learning model trained to output recommendations that optimize a plurality of different performance metrics by scoring only the eligible actions and ranking the eligible actions according to their respective scores; and
      causing display of the one or more recommended next possible graphical user interface actions.

2. The system of claim 1, wherein the action performed at direction of the first user is a graphical user interface action and the next possible actions are next possible graphical user interface actions.

3. The system of claim 1, wherein the at least one signal is a plurality of signals and at least one of the plurality of signals has a request context that indicates a separate domain from a domain specified in another request context for another of the plurality of signals.

4. The system of claim 1, wherein the plurality of different performance metrics include propensity to select a recommended next possible action if the recommended next possible action is displayed to the user, and propensity for long-term engagement with an online network if the recommended next possible action is displayed to the user.

5. The system of claim 1, wherein the inferred intent is inferred using a separate embedding machine learning model trained to produce an embedding based on one or more implicit intent signals of the one or more signals.

6. The system of claim 1, wherein the operations further comprise:
   determining a display context based on the action performed in the graphical user interface and the request context;
   wherein the feeding includes feeding the display context into the deep machine learning model as one of the one or more signals; and
   wherein the causing the graphical user interface to display includes displaying the one or more recommended next possible actions in the display context.

7. The system of claim 1, wherein the one or more signals include one or more explicit signals provided directly by the first user.

8. The system of claim 1, wherein the deep machine learning model includes one or more shared dense layers and, for each of the plurality of different performance metrics, one or more task specific dense layers.

9. The system of claim 1, wherein causing display includes causing display of the one or more recommended next possible graphical user interface actions in another user interface different than the user interface in which the action was performed.

10. The system of claim 9, wherein the user interface is a communications interface and the another user interface is a graphical user interface of an online network operating the deep machine learning model.

11. The system of claim 9, wherein the user interface is a graphical user interface of an online network operating the deep machine learning model and the another user interface is an email interface.

12. The system of claim 1, wherein the deep machine learning model is a multi-task deep machine learning model.

13. A method comprising:
receiving an indication of an action performed in a graphical user interface at direction of a first user;
obtaining one or more signals regarding the first user and a request context of the action, the request context indicating a context of the graphical user interface in which the action was performed, the request context comprising at least one of intra-page context including a number of impressions taken by the first user on a current graphical user interface page, intra-session context including a number of actions taken and a type of action taken by the first user within a current session, or inter-session context including a number of actions of different types which the first user took over a predetermined number of prior sessions;
retrieving, via an Application Program Interface (API) layer request, client-side navigation commands comprising a set of user interface elements currently displayed to the user after performing the action;
obtaining, using the request context and the set of user interface elements currently displayed to the user, eligible actions comprising a list of next possible graphical user interface actions to be performed by the user;
fetching, via a feature retrieval component, feature data for the eligible actions;
training a deep machine learning model on actions comprising entity level impressions made to users and request contexts to output, for a given user and request context, next possible graphical user interface actions to present to the user;
feeding the one or more signals and the feature data for the eligible actions into the deep machine learning model, the deep machine learning model outputting one or more recommended next possible graphical user interface actions from the list of next possible graphical user interface actions based on inferred intent of the first user from the one or more signals, the deep machine learning model trained to output recommendations that optimize a plurality of different performance metrics by scoring only the eligible actions and ranking the eligible actions according to their respective scores; and
causing display of the one or more recommended next possible graphical user interface actions.

14. The method of claim 13, wherein the action performed at direction of the first user is a graphical user interface action and the next possible actions are next possible graphical user interface action.

15. The method of claim 13, wherein the one or more signals is a plurality of signals and at least one of the plurality of signals has a request context that indicates a separate domain from a domain specified in another request context for another of the plurality of signals.

16. The method of claim 13, wherein the plurality of different performance metrics include propensity to select a recommended next possible action if the recommended next possible action is displayed to the user, and propensity for long-term engagement with an online network if the recommended next possible action is displayed to the user.

17. The method of claim 13, wherein the inferred intent is inferred using a separate embedding machine learning model trained to produce an embedding based on one or more implicit intent signals of the one or more signals.

18. The method of claim 13, further comprising:
determining a display context based on the action performed in the graphical user interface and the request context;
wherein the feeding includes feeding the display context into the deep machine learning model as one of the one or more signals; and
wherein the causing the graphical user interface to display includes displaying the one or more recommended next possible actions in the display context.

19. A non-transitory machine-readable medium storing instructions which, when executed by one or more processors, cause the one or more processors to perform operations comprising:
receiving an indication of an action performed in a graphical user interface at direction of a first user;
obtaining one or more signals regarding the first user and a request context of the action, the request context indicating a context of the graphical user interface in which the action was performed, the request context comprising at least one of intra-page context including a number of impressions taken by the first user on a current graphical user interface page, intra-session context including a number of actions taken and a type of action taken by the first user within a current session, or inter-session context including a number of actions of different types which the first user took over a predetermined number of prior sessions;
retrieving, via an Application Program Interface (API) layer request, client-side navigation commands comprising a set of user interface elements currently displayed to the user after performing the action;
obtaining, using the request context and the set of user interface elements currently displayed to the user, eligible actions comprising a list of next possible graphical user interface actions to be performed by the user;
fetching, via a feature retrieval component, feature data for the eligible actions;
training a deep machine learning model on actions comprising entity level impressions made to users and request contexts to output, for a given user and request context, next possible graphical user interface actions to present to the user;
feeding the one or more signals and the feature data for the eligible actions into the deep machine learning model, the deep machine learning model outputting one or more recommended next possible graphical user interface actions from the list of next possible graphical user interface actions based on inferred intent of the first user from the one or more signals, the deep machine learning model trained to output recommendations that optimize a plurality of different performance metrics by scoring only the eligible actions and ranking the eligible actions according to their respective scores; and causing display of the one or more recommended next possible graphical user interface actions.

20. The non-transitory machine-readable medium of claim 19, wherein the action performed at direction of the first user is a graphical user interface action and the next possible actions are next possible graphical user interface action.

\* \* \* \* \*